US007601951B1

(12) United States Patent
Whitehouse et al.

(10) Patent No.: US 7,601,951 B1
(45) Date of Patent: Oct. 13, 2009

(54) CONFIGURATION OF AN ATMOSPHERIC PRESSURE ION SOURCE

(75) Inventors: Craig M. Whitehouse, Branford, CT (US); Michael Sansone, Hamden, CT (US); Clement Catalano, Clinton, CT (US)

(73) Assignee: Analytica of Branford, Inc., Branford, CT (US)

(*) Notice: Subject to any disclaimer, the term of this patent is extended or adjusted under 35 U.S.C. 154(b) by 0 days.

(21) Appl. No.: 09/423,471

(22) PCT Filed: May 17, 1997

(86) PCT No.: PCT/US97/08550

§ 371 (c)(1), (2), (4) Date: Mar. 28, 2000

(87) PCT Pub. No.: WO98/52682

PCT Pub. Date: Nov. 26, 1998

(51) Int. Cl.
*B01D 59/44* (2006.01)

(52) U.S. Cl. ....................... 250/289; 250/288; 250/290; 250/291

(58) Field of Classification Search .................. 250/289
See application file for complete search history.

(56) References Cited

U.S. PATENT DOCUMENTS 3,767,925 A * 10/1973 Foley et al. ................. 250/251
5,753,795 A * 5/1998 Kuypers .................... 73/23.37

* cited by examiner

*Primary Examiner*—David A. Vanore
*Assistant Examiner*—Phillip A. Johnston
(74) *Attorney, Agent, or Firm*—Levisohn Berger LLP

(57) ABSTRACT

An API source for mass spectrometry which is configured such that all or a portion of its vacuum assembly, including ion focusing and transport electrostatic lenses and ion guides, and two or more vacuum stages can be removed from the source or system vacuum housing as a complete assembly. The API source may be an ES, APCI or ICP source, or any other ion source which operates at substantially atmospheric pressure. The insert assembly can be electrically isolated from the grounded vacuum housing to enable the delivery of kilovolt potential ions into a magnetic sector mass analyzer from the API source. The insert assemblies can be configured to interface to quadrupole, Time-Of-Flight, ion trap, Fourier Transform, and magnetic sector mass analyzers. Electrical connections can be configured internally to make and break automatically when said insert assembly is inserted or removed from the surrounding vacuum housing. The insert assembly is configured to be removed from the vacuum housing without the need to disconnect vacuum pumps, vacuum pumping lines, vacuum gauges, or external electrical connectors. The invention simplifies the cleaning and maintenance of API mass analyzer systems, can reduce the cost and complexity of said systems and can reduce instrument down time. The API insert assembly removal allows for the insertion of alternative ion sources, for example, Laser Desorption, Electron Bombardment, Chemical Ionization, Thermospray, and Particle Beam hardware which can utilize the same vacuum pumps and electrical contacts as are used by the API source.

7 Claims, 4 Drawing Sheets

CONFIGURATION OF AN ATMOSPHERIC PRESSURE ION SOURCE

RELATED APPLICATIONS

The present application claims the priority of U.S. Provisional Patent Application No. 60/017,584, filed May 16, 1996, the disclosure of which is incorporated herein by reference.

FIELD OF THE INVENTION

This invention relates in general to mass spectrometers and in particular to the construction of atmospheric pressure ionization sources. By providing single assembly access to multiple internal stages of these ion sources, the invention simplifies the cleaning and maintenance of API mass analyzer systems, can reduce the cost and complexity of these systems, and can reduce instrument down time associated with cleaning, maintenance, and ion source changeover. A single assembly construction allows increased mechanical precision with a lower cost of manufacture.

BACKGROUND OF THE INVENTION

Since the advent of electrospray (which is extensively described by U.S. Pat. Nos. 4,531,056 and 4,542,293), Electrospray (ES) and Atmospheric Pressure Chemical Ionization (APCI) source designs have evolved. Descriptions of ion sources which operate at atmospheric pressure, such as ES and APCI interfaced to mass analyzer systems, are found in U.S. Pat. Nos. 5,581,080; 5,432,343; 5,157,260; 5,130,538; 5,015,845; 4,999,493; 4,977,320; 4,209,696; 4,144,451; 4,137,750; 4,121,099; and 4,023,398 (the disclosures of which are incorporated herein by reference). Earlier ES and APCI sources were designed to maximize analytical performance with less regard for the convenience and ease of cleaning and maintenance as the main design criteria. Later, commercially available API sources from mass spectrometer (MS) manufacturers, including Perkin-Elmer Sciex and Finnigan, were designed for increased user convenience in maintenance of API sources. These API mass spectrometer systems which include two to three vacuum stages have assemblies that plug into the front of the instrument or swing open via a hinged joint. These commercially available removable assemblies include no more than two vacuum partitions and the ion guide assemblies included in these instruments are only removable as separate assemblies. However, these assemblies which include an ion optics transfer assembly with one or two vacuum pumping stage partitions, only allow access to the first vacuum stage or second vacuum stage and do not allow easy access to deeper vacuum stages or other ion optics without completely removing additional assemblies from the mass spectrometer. These commercially available removable assemblies include an orifice or a capillary into vacuum, as well as a skimmer, but do not include multipole ion guide(s) in the same removable assemblies.

The ability to interface to liquid introduction systems has greatly broadened the appeal of mass spectrometry as an analytical technique. As a direct consequence of this appeal, substantial resources have been invested and significant costs incurred by end-users for the operation and maintenance of mass spectrometric instrumentation, thereby placing an increased premium on instrument ruggedness, robustness and operability. At the same time, the diversity of backgrounds of all of the possible end-users of this technology all but prohibits having an expert in mass spectrometric hardware design continually on-site and available for complex instrument maintenance. The present inventors have recognized and addressed the current problems in the prior art by development of the present invention, which makes the optimal practice of API-MS more accessible.

SUMMARY OF THE INVENTION

An API source interfaced to a mass analyzer has been configured such that a portion or all of the vacuum assembly of the API source and ion optics assembly (or assemblies) and the vacuum stage partitions, can be removed from the source or system vacuum housing as a complete insert assembly. This insert assembly can include all or a portion of the atmospheric pressure chamber assembly. The API source used can be any ion source which operates at substantially atmospheric pressure, such as ES, APCI, Inductively Coupled Plasma (ICP), and Gas Phase Corona or Glow Discharge sources. The insert assembly can be electrically isolated from the grounded vacuum housing to enable the delivery of kilovolt potential ions into a high energy mass analyzer from an API source, such as a magnetic sector mass analyzer. The insert assembly can be configured to interface to quadrupole, time-of-flight, ion trap, Fourier Transform, and magnetic sector mass analyzers. Electrical connections can be configured internally to make and break automatically when the insert assembly is inserted or removed from the surrounding vacuum housing. The insert assembly is configured to be removed from the vacuum housing without the need to disconnect vacuum pumps, vacuum pumping lines, vacuum gauges, or external electrical connectors. The invention thus simplifies the cleaning and maintenance of API mass analyzer systems, can reduce the cost and complexity of these systems and can minimize instrument down time. Likewise, the simpler disassembly and cleaning procedure allows the practice of API-MS by those less skilled in or concerned with the complexities of instrument maintenance. The API insert assembly design also allows for the insertion of alternative non-API ion sources and hardware which can utilize the same vacuum pumps and electrical contacts as are used by the API source and its ion optics.

BRIEF DESCRIPTION OF THE DRAWINGS

The objectives and features of this invention will be better understood in conjunction with the following drawings.

DESCRIPTION OF THE PREFERRED EMBODIMENTS

The design of an Atmospheric Pressure Ion Source (API) which interfaces to a mass analyzer has been configured to allow the removal of most or all of the source vacuum assembly, including ion optics assemblies located in vacuum, without detachment of external vacuum pumps, or disassembly of vacuum housings or external connections. An API source and ion optics assemblies configured in such a manner allow simple cleaning and maintenance procedures, reduces instrument down time, and reduces the number of parts. Thus, the cost of such an API source can be reduced. With the ability to remove the core of the API source while leaving the vacuum pumping system housing and pump assembly in place, different types of ion sources, including but not limited to, Laser Desorption (LD), Electron Bombardment (EI), Chemical Ionization (CI), Thermospray (TS) and Particle Beam (PB), can be plugged into the region vacated by the API source removable ion transfer optics and vacuum partition assembly. The API sources which can be used include, but are not limited to, Electrospray (ES), Atmospheric Pressure Chemical Ionization (APCI) Inductively Coupled Plasma (ICP), and Gas Phase Corona or Glow Discharge sources. The API source with the ion transfer optics and vacuum partitions assembly, may contain from two to four vacuum partitions depending on the vacuum pumping configuration and the mass analyzer type. The ion transfer optics and vacuum partitions assembly is removed and inserted axially through the front end of the system vacuum housing. Removal and installation of the API source and the ion transfer optics and vacuum partitions assembly takes only a few minutes, facilitating cleaning and maintenance, and reducing instrument downtime. The inclusion of the ion transfer optics in one removable assembly allows for increased mechanical tolerances to be achieved with lower manufacturing costs and simplified maintenance procedures. The increased tolerance, particularly with respect to the axial alignment, improves sensitivity by minimizing losses in transmission of the primary ion beam.

Figure 1:
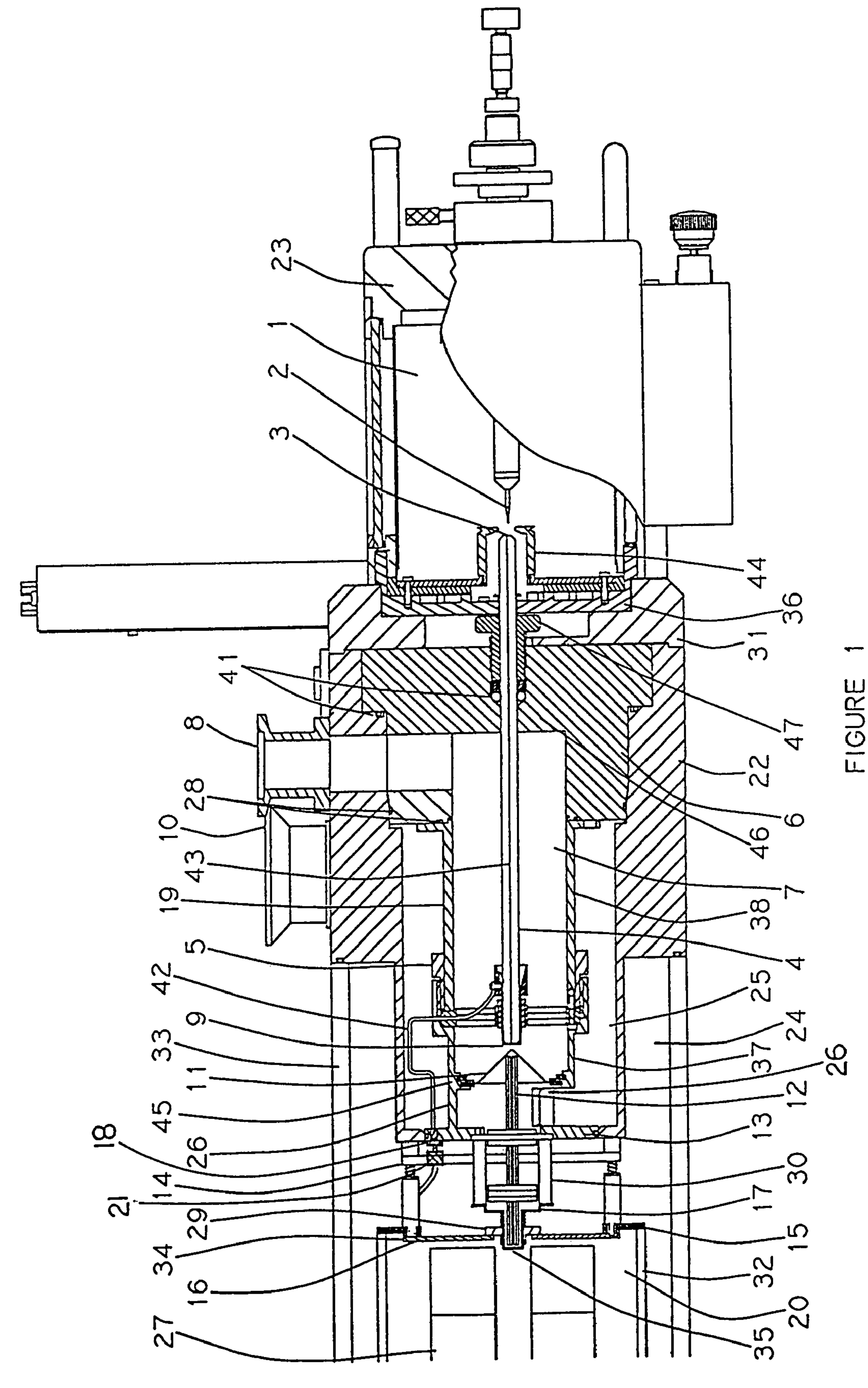
FIG. 1 is a cross sectional view showing an embodiment of the invention in which the design of the insert source assembly includes four vacuum stages and four vacuum partitions interfaced to a quadrupole mass analyzer.
Figure 2:
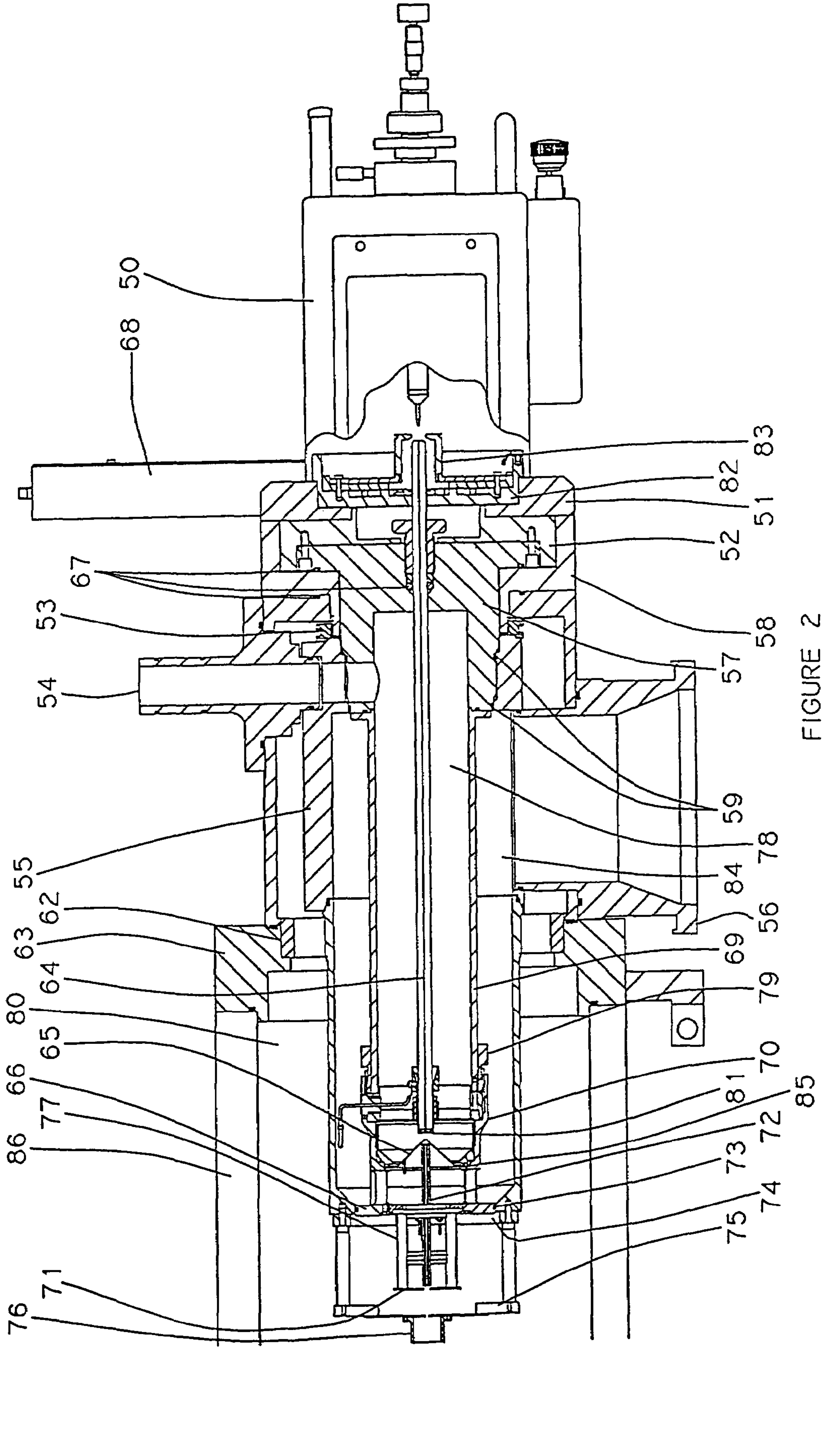
FIG. 2 is a cross sectional view showing an embodiment of the invention having an electrically isolated insert assembly with three vacuum partitions which can accommodate three vacuum pumping stages. The second vacuum stage may be evacuated by a turbomolecular pump. The assembly shown can deliver ions having kinetic energies up to several kilovolts into an appropriate mass analyzer (such as magnetic sectors and in some designs time-of flight mass analyzers).
Figure 3:
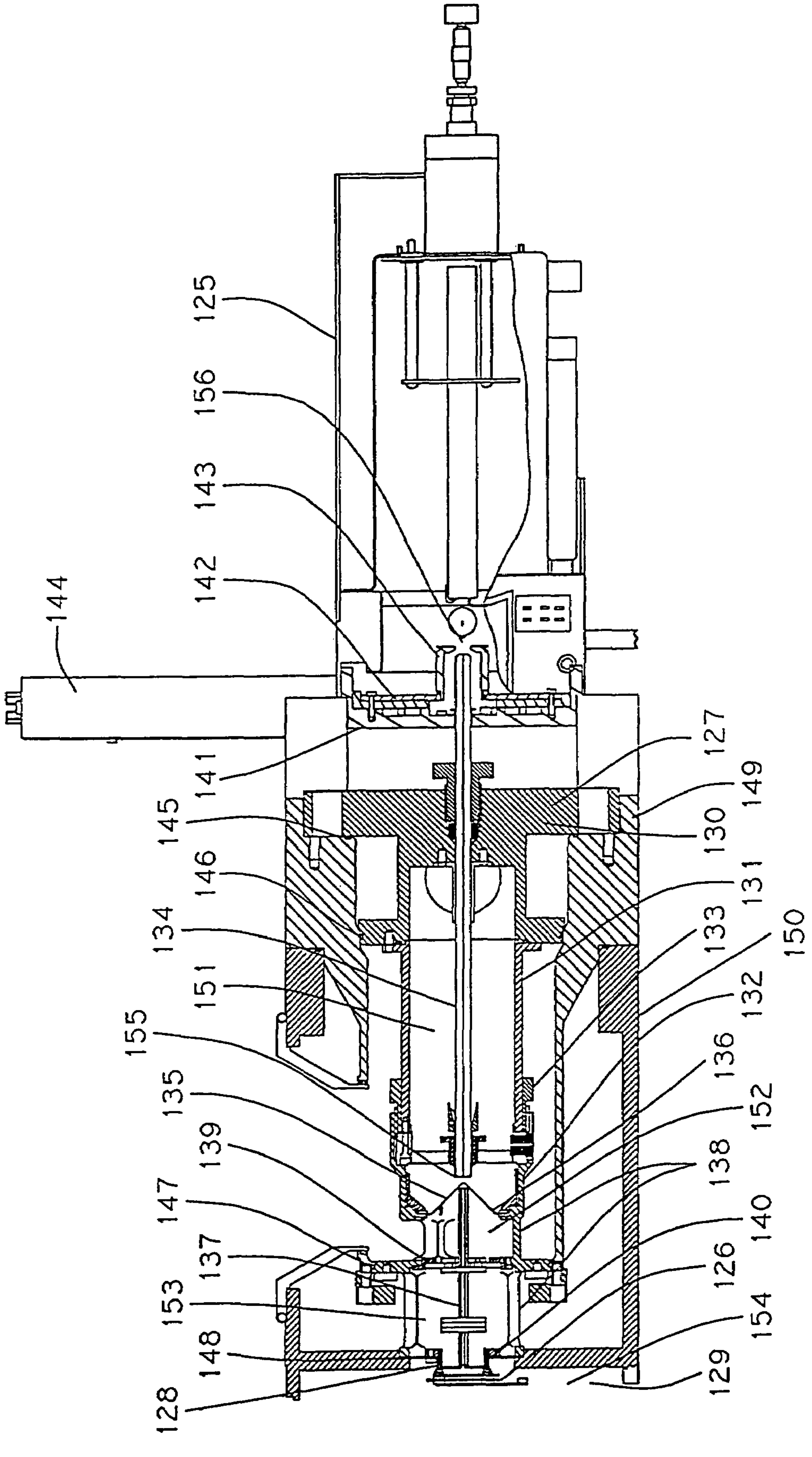
FIG. 3 is a cross sectional view showing an embodiment of the invention in which a single insert assembly includes four vacuum stage partitions to accommodate four vacuum stages interfaced to any mass analyzer. The second vacuum stage may be evacuated by a turbomolecular pump.

One embodiment of the invention is illustrated in FIG. 1. In this embodiment, the API source insert assembly includes four vacuum stage partitions and the entire vacuum ion optics assembly which transports ions from the API source to the entrance region of the mass analyzer. As one example of an API source, an Electrospray (ES) Ionization source with pneumatic nebulization assist is shown. The API source assembly includes everything but vacuum chamber walls 32 and 33 and the quadrupole mass analyzer 27. The ES source in FIG. 1 is interfaced to a quadrupole mass analyzer and the API source-mass analyzer assembly includes four vacuum stages. Charged liquid droplets which lead to the production of ions are produced in the atmospheric ES chamber 1 inside ES chamber housing 23. Liquid sample enters ES source chamber 1 and forms a spray of charged liquid droplets from ES probe tip 2 during operation of the ES source. The evaporation of the charged liquid droplets which are formed in the Electrospray process results in the formation of sample related ions. A portion of these ions are entrained in the gas entering the capillary 4 orifice 43 at capillary entrance 3 and are swept into vacuum. Although a capillary is shown in FIGS. 1-3 as the orifice for introducing ions from atmospheric pressure to vacuum, other means may also be used. For example, a nozzle, a heated capillary or a thin plate orifice may be used as the orifice into vacuum, as well.

Ions and neutral gas moving through orifice 43 in capillary 4, pass out of the capillary exit 9 into the first vacuum stage 7. The ions enter the first vacuum pumping stage 7 and are accelerated in a supersonic expansion between capillary exit 9 and skimmer 11. A portion of the ions which enter the first vacuum stage 7 pass through the orifice of skimmer 11 and enter ion guide 12. Ion guide 12 extends continuously through multiple vacuum stages, transferring a portion of the ions which pass through skimmer 11 directly into the quadrupole mass analyzer 27 located in the fourth vacuum stage 20. The ion guide assembly 12 forms part of the vacuum partition 13 separating the second 25 and third 24 vacuum stages. Ions traveling along the length of ion guide 12 move through two vacuum stages 25 and 24 and are delivered to the fourth vacuum stage 20 through a multipole ion guide exit lens 17 orifice 35 directly into quadrupole mass analyzer 27. Ion guide exit lens 17 and an insulator 29 form a portion of the vacuum partition 34 which separates the third vacuum stage 24 and the fourth vacuum stage 20. Hence, ions produced in the ES source 1 at or near atmospheric pressure move through four vacuum stages 7, 25, 24, 20 and four vacuum stage partitions (i.e. respectively, 46; 45 and 11; 13; and 34 & 17, respectively) during ion transport leading to mass analysis. By at or near atmospheric pressure, we refer herein, for example, to pressures from approximately 100 torr to 2 atmospheres, although the exact range may depend on the configuration.

The four vacuum stage partitions separating the four vacuum stages from atmospheric pressure and each other are included in one assembly which can be removed axially through the front end of vacuum housing 22. Insert section 6, capillary 4, vacuum housing 22, and vacuum seals 41 are included in vacuum partition 46 between atmospheric pressure and first vacuum stage 7. Tube assembly 19, which includes the vacuum stage tube section 38 connected to skimmer mount assembly 37, skimmer 11, and vacuum seal 28, forms the vacuum partition 45 between first vacuum stage 7 and second vacuum stage 25. First vacuum stage 7 is evacuated through pumping port 8 which is mounted to vacuum housing 22. Vacuum partition 13 fabricated as an integral part of the skimmer mount assembly 37 connected by web sections 26 separates second vacuum stage 25 and third vacuum stage 24. Skimmer mount assembly 37 is connected to the first stage tube 38 with hand nut 5. Second vacuum stage 25 is evacuated through pumping port 10 mounted to vacuum housing 22. Exit lens 17 with insulator 29, seal plate 16 and seal 15 form the vacuum partition 34 between third vacuum stage 24 and fourth vacuum stage 20. The design of the ES source as illustrated in FIG. 1 allows the removal of four vacuum partitions and the entire vacuum ion optics configuration of the ES source as one assembly. The removable insert assembly includes but is not limited to parts and subassemblies 4, 5, 6, 9, 11, 12, 13, 14, 18, 17, 19, 26, 28, 29, 30, 37, 38, 41, 42, 45, 46 and 47. The insert assembly may also include outer retainer 31, endplate assembly 36, counter current drying gas nose piece 44 and electrospray chamber assembly 23, or any combination thereof. A ring electrostatic lens may also be added between capillary exit 9 and skimmer 11 and a heater may be added to heat capillary 4 both of which would be included in the insert assembly. The insert assembly may be configured to contact grounded vacuum housing 22 whereby parts 6, 13, 37 and 38 would be electrically connected to ground potential. Capillary exit 9, skimmer 11, ion guide 12 and exit lens 17 are electrically insulated from ground potential. An added ring lens positioned between capillary exit 9 and skimmer 11 would also be electrically insulated from ground. Capillary 4 can be a metal or a dielectric capillary with or without a heater added. With the proper repositioning of the skimmer 11 and vacuum pumping ports 8 and 10, capillary 4 can be replaced with a nozzle orifice.

The entire insert assembly can be removed from vacuum chamber housings 22 and 33 without disconnecting vacuum pumps or vacuum lines from ports 8 and 10. In the embodiment of the invention shown in FIG. 1, the electrical voltage feedthroughs which supply voltage to the ion guide exit lens 17, ion guide 12, skimmer 11 and capillary exit 9 are configured such that the insert assembly can be removed without any need for the user to disconnect or unplug any voltage connector either inside or outside of vacuum chamber housings 22 and 33. The electrical voltages are supplied to these elements through contact block 14 which is located in the third vacuum stage 24 and is mounted to vacuum housing 22. Wires extend from a vacuum electrical feedthrough mounted to vacuum housing 22 and terminate at contact block 14. Vacuum partition 13 includes contacts 21 which align and contact complimentary contacts 18 in contact block 14. In the preferred embodiment, contacts 21 are spring loaded, however, other type connectors or contacts can be used. Wires extend from vacuum lens elements and ion guide 12 to contacts on vacuum partition 13. For example, capillary exit 9 is connected to wire 42 which feeds through the wall of the first stage tube 38 and is connected to contact 18 on vacuum partition 13. When the insert assembly is installed, the aligning spring contacts, including mating contacts 18 and 21, automatically engage between those located on contact block 14 and the complimentary contacts on vacuum partition 13. In this manner, voltage can be supplied to exit lens 17, ion guide 12, skimmer 11 and capillary exit 9 or other ion optic elements included with the insert assembly from external power supplies. Thus, the insert assembly can be installed and removed with the electrical connections making and breaking automatically. Even if voltages are applied to contact block 14 connector during insertion or removal of the insert assembly, the user is not exposed to any voltage during insertion or removal of the insert assembly. The insert assembly, when removed, can be quickly disassembled for cleaning or maintenance. A subassembly which includes insulator 29, ion guide exit lens 17, standoffs 30, vacuum partition 13, ion guide 12, skimmer 11 and skimmer mount assembly 37 can be removed from the capillary exit 9 assembly and the first stage tube 38 by unscrewing hand nut 5. Removal of this subassembly facilitates the cleaning of skimmer 11 and capillary exit 9 while protecting the skimmer 11 tip and the ion guide 12 assembly from being accidentally damaged during handling. Capillary 4 can be removed by loosening the capillary nut 47 which compresses seal 41, and then sliding capillary 4 out of block 6. Capillary 4 can be removed and reinserted when the insert assembly itself is either installed or removed. Prior to removing either capillary 4 or the insert assembly, all four vacuum stages must be vented to atmosphere. The vacuum pumps can either be turned off or valved off prior to venting vacuum stages 7, 25, 24 and 20.

The embodiment of the invention shown in FIG. 1 is configured to deliver lower energy ions up to several hundred volts from an API source into vacuum. The embodiment shown in FIG. 1 includes a quadrupole mass analyzer 27 and also includes four vacuum partitions 46, 45 and 11, 13, 34 and 17 incorporated into the insert assembly. Alternatively, with the appropriate modifications to the lens systems and vacuum housing configurations, the invention can be configured to interface to other mass analyzer types, including, but not limited to: linear Time-Of-Flight, orthogonal pulsing Time-Of-Flight, Fourier Transform mass analyzers and three dimensional ion traps. The insert assembly can be configured to include two, three or four vacuum partitions depending on system requirements. Each of the insert assembly types can be configured to include electrical contact assemblies which will make and break on insertion and removal of the insert assembly.

Ion Guide 12 as shown extends continuously into vacuum stages 25 and 24. Alternatively, more than one ion guide can be mounted in successive vacuum stages or within a single vacuum stage. For example, an ion guide can begin and end in vacuum stage 25 and a second ion guide can begin and end in vacuum stage 24, separated by an electrostatic lens which also could also serve the dual function of a vacuum partition between vacuum stages 24 and 25. At least one of the multiple vacuum stage ion guides or single vacuum stage ion guides can be operated in mass selective mode, or in RF only mode for wide m/z range ion transmission. With the appropriate resonant frequency applied to the poles of at least one of these multipole ion guides, collision induced ion fragmentation can occur in the higher pressure regions. Ion guides can also be operated in trapping mode when the exit lens voltage of a given ion guide is raised above the axial kinetic energy of ions within the ion guide. A first ion guide which is included in the API insert assembly can be operated in mass selective mode and transmit ions to a second ion guide where CID fragmentation can occur. The second ion guide can also be included within the API source and insert assembly. Other combinations of mass selection, fragmentation, trapping and storage can be effected, as well.

For mass analyzer types which require ion energies in the kilovolt range (such as magnetic sector and in some designs Time-Of-Flight), the insert assembly can be configured in a manner wherein the assembly is electrically isolated from ground potential. An example of such an embodiment of the invention, which can deliver ions at kilovolt potentials into vacuum from an API source, is provided in FIG. 2.

FIG. 2 shows an Electrospray source assembly which interfaces to a Time-of-Flight or a magnetic sector mass analyzer, and includes an insert assembly which can be floated up to a potential of several kilovolts. This embodiment of the invention can deliver ions into vacuum from an API source at potentials in excess of 8,000 volts. In the embodiment shown in FIG. 2, the high voltage insert assembly includes but is not limited to insulator 52, vacuum partition 57, seals 59, tube section 69, skimmer mount assembly 70, hand nut 79, capillary 64, skimmer 65, vacuum partition 66, ion guide 72, standoffs 77, and ion guide exit lens 71. The high voltage insert assembly may also include plate 51, endplate assembly 82, nose piece 83, counter current drying gas heater 68, and ES source chamber 50. The insert assembly includes and forms vacuum seals with seals 59, 67, and 73. This high voltage assembly is removed by axially sliding the assembly out of vacuum housing assembly 63, 86 and 55 and insulator 58. The high voltage insert assembly includes three vacuum stage partitions 57, 85, and 65 & 66. Vacuum partition 57 separates the first vacuum stage 78 and third vacuum stage 80 from each other and atmospheric pressure. Skimmer 65 mounted to assembly 70 and tube section 69 forms vacuum partition 85 between the first vacuum stage 78 and second vacuum stage 84. Third vacuum partition 66 incorporated into the high voltage insert assembly forms a vacuum partition between the second vacuum stage 84 and the third vacuum stage 80. The high voltage insert can alternatively be configured to include a ring lens between capillary exit 81 and skimmer 65 and a heater to heat capillary 64. With the appropriate modifications of the geometry, capillary 64 may be replaced by a nozzle orifice between an atmospheric pressure source and the first vacuum stage 78.

In the embodiment shown in FIG. 2, an inner housing including 55 extending from insulator 53 to vacuum partition 66 is electrically isolated from the grounded outer vacuum housing assemblies 63 and 86 by electrical insulators 53, 54, 56, 58, and 62. The first vacuum pumping stage port 54 and the second vacuum pumping stage port 56 are electrical insulators as well as vacuum ports. First vacuum stage 78 is evacuated through pumping port 54 and second vacuum stage 84 is evacuated through pumping port 56. Similar to the insert assembly described in FIG. 1, the electrical connections to the capillary exit lens 81, skimmer 65, ion guide 72 and ion guide exit lens 71 are made though contact block 74 when the high voltage insert assembly is installed as shown in FIG. 2. Additional electrostatic lens assembly 76 has been mounted through insulator 75 to contact block 74 in the API source and vacuum ion transfer optics assembly shown in FIG. 2. Alternatively, additional lenses can be configured to mount on the high voltage insert assembly. The electrically isolated high voltage insert assembly can be raised to several thousand volts above ground potential during operation. This allows the delivery of kilovolt potential ions into a Time-Of-Flight or magnetic sector mass analyzer from Electrospray source 50. The high voltage insert assembly can be removed from vacuum source housings 63 and 86 without disconnecting vacuum pumps or vacuum pumping lines and without the need to disconnect any voltage or gas connections external to vacuum housings 63 and 86. For the embodiment of the invention shown in FIG. 2, vacuum stages 78, 84, 80 and subsequent vacuum stages not isolated from vacuum stage 80 must be vented prior to the removal of the high voltage insert assembly. When the high voltage insert assembly is reinstalled, all of the vacuum seals and electrical connections are made automatically and the system is immediately ready for vacuum pump down and operation. As with the low voltage API source insert assembly, voltages, even kilovolt potentials, may remain on during removal or insertion of the API source insert assembly, without compromising user safety.

In another embodiment which is shown in FIG. 3, the API source insert assembly includes four vacuum stage partitions. The second vacuum stage may be evacuated by a turbomolecular pump or any other pump with appropriate pumping speed. API source chamber assembly 125 is shown in this embodiment. Also shown in this embodiment is additional lens assembly 126 attached to API source insert assembly 127. This additional lens assembly 126 is located between the ion guide exit lens 128 and the entrance to the mass analyzer 129. In the embodiment shown in FIG. 3, the insert assembly 127 includes, but is not limited to, vacuum partition 130, tube section 131, skimmer mount assembly 132, hand nut 133, capillary 134, skimmer 135, vacuum partition 136, ion guide 137, web sections 138, vacuum partition 139, vacuum partition 140, ion guide exit lens 128 and additional lens assembly 126. The insert assembly may also include plate 141, endplate assembly 142, nose piece 143, counter current drying gas heater 144 and API source chamber assembly 125. The insert assembly includes and forms vacuum seals with seals 145, 146, 147, and 148. The assembly is removed by axially sliding the assembly out of vacuum housing assembly 149 and 150. This insert assembly includes four vacuum stage partitions 130, 136, 139, 140. Partition 130 isolates the first vacuum stage 151 and atmospheric pressure. Skimmer 135, a portion of assembly 132, and tube section 131, form a vacuum partition 136 between the first vacuum stage 151 and second vacuum stages 152. The third vacuum partition 139 incorporated into the insert assembly isolates the second vacuum stage 152 from the third vacuum stage 153. Vacuum partition 140 and ion guide exit lens 128 form the fourth vacuum partition included in API source assembly 127, separating third vacuum stage 153 from fourth vacuum stage 154. The insert assembly can alternatively be configured to include a ring lens between capillary exit 155 and skimmer 135 and a heater to heat capillary 134. With the modifications of the geometry, capillary 134 may be replaced by a nozzle orifice between an atmospheric pressure source 125 and the first vacuum stage 151. The insert assembly can be removed from vacuum source housings 149 and 150 without disconnecting vacuum pumps or vacuum pumping lines and without the need to disconnect any voltage or gas connections external to vacuum housings 149 and 150. For the embodiment of the invention shown in FIG. 3, vacuum stages 151, 152, 153, and 154 must be vented prior to the removal of the API source insert assembly 127. When the API source insert assembly 127 is reinstalled, all vacuum seals and electrical and gas connections are made automatically and the system is immediately ready for vacuum pump down and operation.

Figure 4:
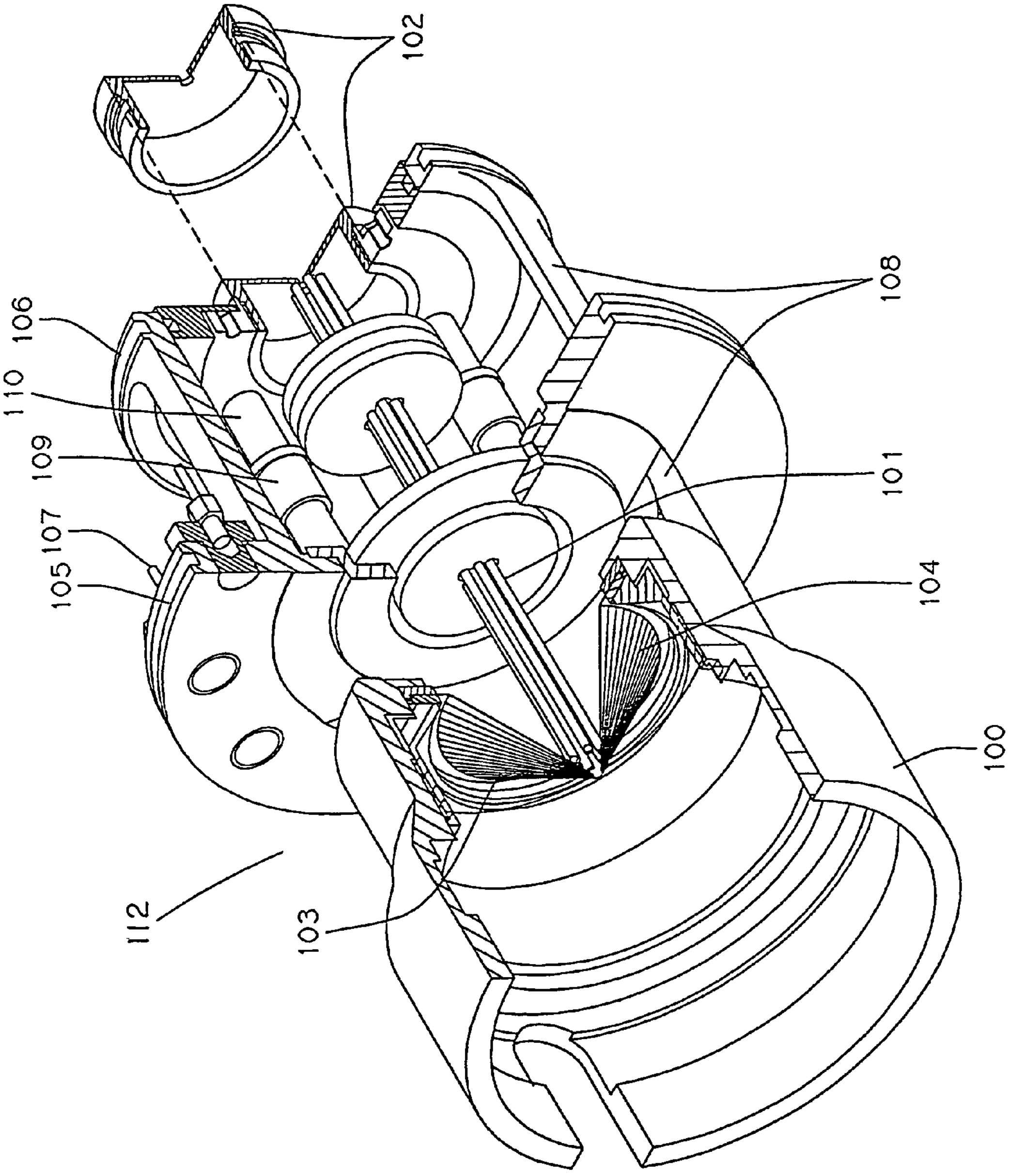
FIG. 4 is an expanded isometric view showing an embodiment of an API source insert subassembly which includes three vacuum pumping stage partitions, skimmer, ion guide, and ion guide exit lens elements.

FIG. 4 is an expanded isometric view of API source insert subassembly 112 which includes skimmer mount assembly 100, ion guide assembly 101, ion guide exit lens 102, standoffs 110 and skimmer 103, in accordance with a representative embodiment of the invention. This view is rotated 180 degrees from the embodiments shown in FIGS. 1-3. Skimmer mount assembly 100 and skimmer 103, are self aligning to the capillary exit in separation and axial alignment when subassembly 112 is installed on the API source insert assembly 127 as shown in FIG. 3. As depicted by the dotted lines in FIG. 4, the ion guide exit lens 102 can be unscrewed to allow easy cleaning of the inside surface and orifice of ion guide exit lens 102. Ion guide 101 and exit lens 102 are self-aligning when exit lens 102 is reinstalled after cleaning. Skimmer 103, which is also self-aligning with the centerline of ion guide 101 when installed in skimmer mount assembly 100, can easily be cleaned when subassembly 112 is removed from the API insert assembly. Self-aligning exit lens 102 and skimmer 103 also serve to protect ion guide 101 from accidental damage. Included in subassembly 112 are three vacuum partitions 104, 105, and 106. Vacuum partitions 105, 106 and web sections 108 are fabricated as a single part within skimmer mount assembly 100. The fabrication of this component as a single part ensures the alignment of skimmer 103, ion guide 101, and exit lens 102, when each is mounted within skimmer mount assembly 100. Vacuum partition 105, in this embodiment, separates the second vacuum stage from the third vacuum stage, and vacuum partition 106 and ion guide exit lens 102 separates the third vacuum stage from the fourth vacuum stage. Subassembly 112 can be configured to include one, two, three or more vacuum partitions. Contacts 107 align and make connect with complimentary spring loaded or other type contacts in the mating contact block not shown in FIG. 4. Cams 109 slide over standoffs 110 and are configured to support the alignment of ion guide assembly 101. This subassembly which is part of the embodiment shown in FIG. 3, may be configured with more than one ion guide, or so forth as discussed below.

Numerous variations of the embodiments of the invention shown in FIGS. 1, 2, 3, and 4 can be configured in API source mass analyzer systems by one skilled in the art. For example, the insert assembly can be configured to include the API chamber as well as the vacuum stage assemblies. Multiple ion guides can be included in the insert assembly. Even a three ion trap or quadrupole mass analyzer can be incorporated as parts of the insert assembly for simple and direct insertion into a vacuum system. The removable API source insert assembly also allows for alternative ion source types to be inserted into the same vacuum housing the same vacuum pumps and even electrical contacts as the API source. For example, an Electron Ionization (EI), Chemical Ionization (CI) or a Laser Desorption Source can be inserted into the vacuum housing replacing the API insert assembly. The first vacuum stage could be configured to serve as a vacuum lock for a sample insertion probe for each of these ion source types. This sharing of hardware reduces system cost and complexity, reduces system down time due to maintenance and source changeover, and increases user convenience.

For all of the embodiments and subassemblies of the present invention, the ion optics assemblies can include one or more multipole ion guides, each of which can be configured as a quadrupole, hexapole, octapole, or as a multipole ion guide with more than eight poles. Combinations of multipole ion guides can also be included in the insert assembly, depending on the configuration desired. Similarly, one or more of these multipole ion guides can be a multiple vacuum stage multipole ion guide, i.e. a multipole ion guide which extends through more than one vacuum stage. Such a multipole extending through multiple vacuum stages is described extensively in our prior U.S. patent application Ser. No. 08/645,826, filed May 14, 1996, the disclosure of which is incorporated herein by reference. The ion optics assembly (or assemblies) included in the API source insert assembly or subassembly may also include a three dimensional ion trap which is configured in place of or in combination with one or more of these multipole ion guides. This ion trap may be used as a mass analyzer with $MS/MS^n$ capability or as the ion pulsing region of a Time-Of-Flight mass spectrometer. In addition, configurations for an ion storage Time-Of-Flight mass spectrometer are disclosed in our prior U.S. patent application Ser. No. 08/689,549 filed Aug. 9, 1996, the disclosure of which is incorporated herein by reference, as well. Furthermore, consistent with the present invention, ion guide assemblies can be replaced by electrostatic lens assemblies which would be included within the API source insert assembly. And, as disclosed previously, at least one of the multiple vacuum stage ion guides or single vacuum stage ion guides can be operated in mass selective mode, or in RF only mode for wide m/z range ion transmission. With the appropriate resonant frequency applied to the poles of at least one of these multipole ion guides, collision induced ion fragmentation can occur in the higher pressure regions. Ion guides can also be operated in trapping mode when the exit lens voltage of a given ion guide is raised above the axial kinetic energy of ions within the ion guide. One ion guide which is included in the API insert assembly can be operated in mass selective mode and can transmit ions to a second ion guide where CID fragmentation can occur. When at least one ion guide is operated in mass selective mode the API source insert assembly includes mass analyzer capability. As such a mass analyzer detector can also be included as part of the ion optics assembly. The second ion guide can also be included within the API source and insert assembly. As previously indicated, other combinations of mass selection, fragmentation, trapping and storage can be effected, as well.

Having described this invention with regard to specific embodiments, it is to be understood that the description is not meant as a limitation since further modifications or variations thereon may suggest themselves or may be apparent to those skilled in the art. It is intended that the present application cover all such modifications and variations as fall within the scope of the appended claims.

References Cited The U.S. Patents referred to above are hereby incorporated herein by reference: U.S. Pat. No. 5,581,080 to J. B. Fenn, et al.; U.S. Pat. No. 5,432,343 to E. E. Gulcicek et al.; U.S. Pat. No. 5,157,260 to I. C. Mylchreest, et al.; U.S. Pat. No. 5,130,538 to J. B. Fenn, et al.; U.S. Pat. No. 5,015,845 to M. Allen, et al.; U.S. Pat. No. 4,999,493 to M. Allen, et al.; U.S. Pat. No. 4,977,320 to S. K. Chowdhury, et al.; U.S. Pat. No. 4,542,293 to J. B. Fenn, et al.; U.S. Pat. No. 4,531,056 to M. J. Labowsky, et al.; U.S. Pat. No. 4,209,696 to W. L. Fite; U.S. Pat. No. 4,144,451 to H. Kambara; U.S. Pat. No. 4,137,750 to J. B. French, et al.; U.S. Pat. No. 4,121,099 to J. B. French, et al.; and, U.S. Pat. No. 4,023,398 to J. B. French, et al.

We claim:

1. An apparatus comprising:

a. an atmospheric pressure ion source for producing ions for delivery into vacuum;

b. a vacuum system housing attached to means for pumping away gas to form said vacuum; and, c. a removable insert assembly which includes at least three vacuum pumping stage partitions for maintaining at least four vacuum stages in said apparatus when said insert assembly is inserted into said vacuum system housing; and d. at least one ion guide configured as part of said removable insert assembly.

2. An apparatus as claimed in claim 1, wherein said removable insert assembly includes an ion optics assembly.

3. An apparatus as claimed in claim 1, wherein said apparatus further comprises a mass analyzer.

4. An apparatus as claimed in claim 1, wherein said mass analyzer further comprises a detector.

5. An apparatus as claimed in claim 1, wherein said mass analyzer is configured as a part of said removable insert assembly.

6. An apparatus as claimed in claim 1, wherein said apparatus further comprises a detector.

7. An apparatus as claimed in claim 1, wherein said apparatus further comprises a mass analyzer, and said mass analyzer is configured as a part of said removable insert assembly.

* * * * *